(12) United States Patent
Hill et al.

(10) Patent No.: US 10,323,994 B2
(45) Date of Patent: Jun. 18, 2019

(54) TORQUE SENSORS

(71) Applicant: TRW Limited, Solihull, West Midlands (GB)

(72) Inventors: Robert Hill, Redditch (GB); Andrew Paul Smith, Warwick (GB); James Stephen Ironside, Birmingham (GB); Matthew Larner, Solihull (GB)

(73) Assignee: TRW Limited, Solihull, West Midlands (GB)

( * ) Notice: Subject to any disclaimer, the term of this patent is extended or adjusted under 35 U.S.C. 154(b) by 141 days.

(21) Appl. No.: 15/544,265

(22) PCT Filed: Jan. 19, 2016

(86) PCT No.: PCT/GB2016/050111
§ 371 (c)(1),
(2) Date: Jul. 18, 2017

(87) PCT Pub. No.: WO2016/116742
PCT Pub. Date: Jul. 28, 2016

(65) Prior Publication Data
US 2018/0010971 A1     Jan. 11, 2018

(30) Foreign Application Priority Data

Jan. 19, 2015 (GB) .................................. 1500876.6

(51) Int. Cl.
*G01L 3/10* (2006.01)
*B62D 6/10* (2006.01)
(Continued)

(52) U.S. Cl.
CPC .............. *G01L 3/10* (2013.01); *B62D 5/0403* (2013.01); *B62D 6/10* (2013.01); *G01L 3/04* (2013.01);
(Continued)

(58) Field of Classification Search
CPC . G01L 3/10; G01L 3/101; G01L 3/102; G01L 3/105; G01L 3/04; B62D 5/0403; B62D 6/10
See application file for complete search history.

(56) References Cited

U.S. PATENT DOCUMENTS

| 4,711,134 A | 12/1987 | Kita |
| 7,845,244 B2 * | 12/2010 | Aoki ....................... G01L 3/104 73/862.331 |

(Continued)

FOREIGN PATENT DOCUMENTS

| DE | 3129115 A1 | 2/1983 |
| DE | 4207668 A1 | 9/1993 |

(Continued)

OTHER PUBLICATIONS

Patents Act 1977: Search Report Under Section 17(5), Application No. GB1500876.6, dated Jul. 16, 2015.
(Continued)

*Primary Examiner* — Kevin Hurley
*Assistant Examiner* — Marlon A Arce
(74) *Attorney, Agent, or Firm* — MacMillan, Sobanski & Todd, LLC

(57) ABSTRACT

A torque sensor for use in an electric power assisted steering system comprises a first shaft, a second shaft, and a torsion bar, a hollow sleeve that is secured to the first shaft and extends along the torsion bar to at least partially axially overlap the second shaft, angular deflection indicating means that produce a signal that is dependent on the angular deflection of the first shaft relative to the second shaft as a torque is applied across the torque sensor that causes the torsion bar to twist, at least one drive dog fixed to the sleeve and at least one corresponding drive dog fixed to the second shaft, in normal operation the two dogs being offset so that they permit a defined range of angular deflection of the (Continued)

torsion bar but will engage each other to provide a path for torque to be transferred from the first shaft to the second shaft in the event of a failure of the torsion bar, and a connecting element which has a first part that is secured within a bore in one of the second shaft and the sleeve, the connecting element having a second part that extends into a feature of the other of the second shaft and the sleeve, at zero torque across the torque sensor the connecting element being spaced circumferentially from the feature by an angular distance greater than the spacing between the drive dogs and spaced from the feature in a direction along the axis of the shafts that is less than the overlap of the drive dogs in that direction to prevent the shafts moving apart in the event of failure of the torsion bar by an amount that would otherwise prevent the drive dogs engaging.

15 Claims, 5 Drawing Sheets

(51) Int. Cl.
*G01L 3/04* (2006.01)
*B62D 5/04* (2006.01)

(52) U.S. Cl.
CPC .............. *G01L 3/101* (2013.01); *G01L 3/102* (2013.01); *G01L 3/105* (2013.01)

(56) References Cited

U.S. PATENT DOCUMENTS

| | | |
|---|---|---|
| 8,844,380 B2 * | 9/2014 | Takahashi ............... G01L 3/104 73/862 |
| 2007/0017313 A1 | 1/2007 | Pattok et al. |
| 2014/0260684 A1 * | 9/2014 | Christmann ............... G01L 3/10 73/862.325 |
| 2017/0003182 A1 * | 1/2017 | Schweizer ............... G01L 3/101 |

FOREIGN PATENT DOCUMENTS

| | | |
|---|---|---|
| DE | 102005008187 A1 | 8/2006 |
| EP | 1707932 A2 | 10/2006 |

OTHER PUBLICATIONS

International Search Report and Written Opinion, Application No. PCT/GB2016/050111, dated Apr. 21, 2016.

* cited by examiner

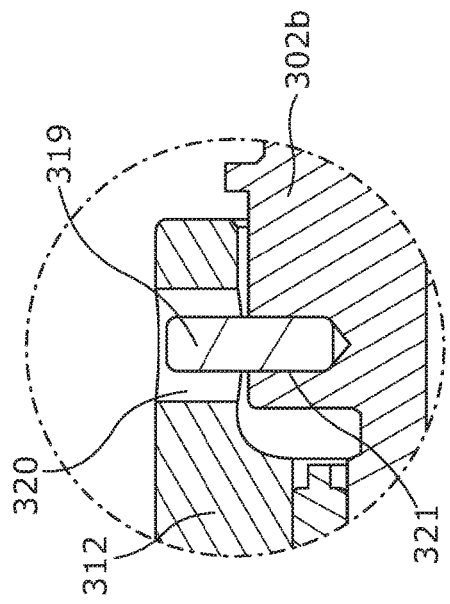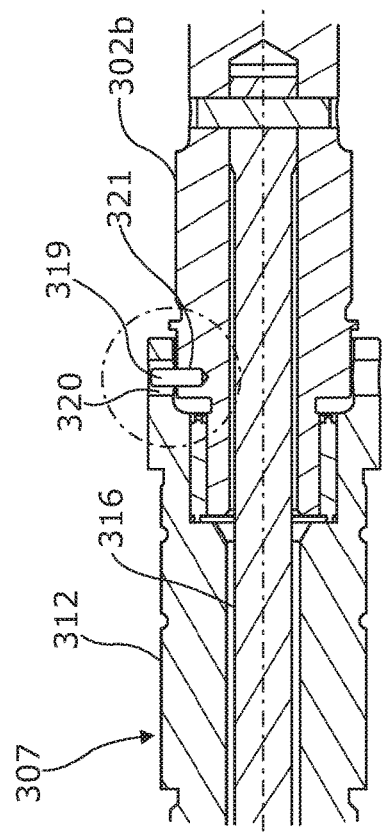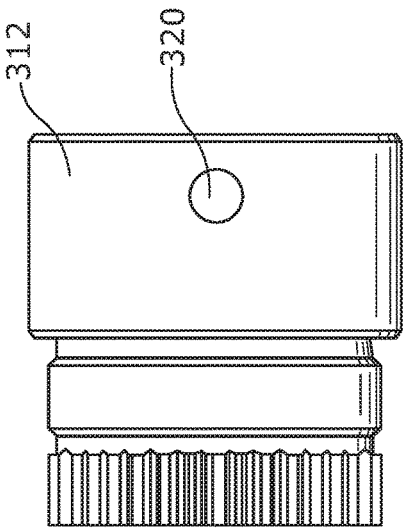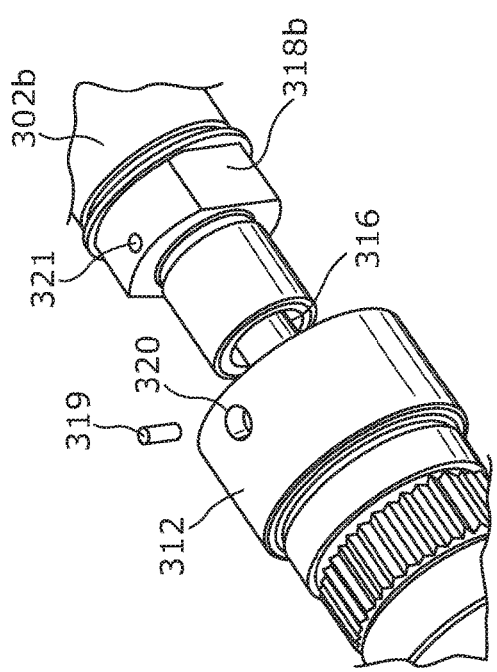

TORQUE SENSORS

CROSS-REFERENCE TO RELATED APPLICATIONS

This application is a national stage of International Application No. PCT/GB2016/050111, filed 19 Jan. 2016, the disclosures of which are incorporated herein by reference in entirety, and which claimed priority to Great Britain Patent Application No. 1500876.6, filed 19 Jan. 2015, the disclosures of which are incorporated herein by reference in entirety.

BACKGROUND OF THE INVENTION

This invention relates to improvements in torque sensors, particularly for use in electric power assisted steering systems. It also relates to an electrically assisted power steering system that incorporates a torque sensor.

It is known to provide an electrically assisted power steering system in which an electric motor applies a torque to the steering that assists the driver in turning the wheel. In a typical column drive system this comprises a steering column shaft that is supported within a shroud. The shaft is connected to the steering wheel at one end and engages a gearbox at the other. The gearbox connects the shaft to an electric motor and also to the steered wheels of the vehicle. The electric motor is driven by a suitable drive circuit to apply the torque, and the drive circuit responds to a torque demand signal produced by a controller. A torque sensor is provided which measures the torque applied to the column shaft by the driver, or measures the torque at some other point in the system depending on the type of system produced. This torque measurement is fed into the controller and used as the basis for producing the torque demand signal. Generally speaking the higher the measured torque, the larger the value of the assistance torque.

The assistance torque applied by the motor can also vary as a function of vehicle speed or other vehicle operating parameters. Indeed the motor can also be used to apply other torques that may be helpful in controlling the vehicle.

A number of different torque sensors are available but commonly a torque sensor is used that works by measuring the differential angular displacement between the two ends of a torsion bar that is connected in line between the column shaft and the gearbox. The angular displacement can be measured using a range of different sensors, with magnetic or inductive type sensors being commonplace due to their relatively low production cost. As the sensors are well known they will not be described here in detail.

The torque sensor is generally housed within the gearbox. By securing the motor to the gearbox housing all of the electric assistance parts of the steering system can be manufactured as a single compact unit.

The torsion bar provides a mechanical link between the steering wheel and road wheels. To prevent damage to the torsion bar in the event that excessive torsional loads are applied (perhaps when the vehicle road wheels hit an obstacle at speed) it is known to provide drive dogs that engage to limit the amount of twist that the torsion bar will experience. This also provides a continued mechanical connection in the very unlikely event that the torsion bar fails, albeit that there will be some free play present.

In such an event, there is a risk that the steering column shaft could move axially and separate the two ends of the torque sensor so that the dogs will not engage when the steering wheel is rotated. In the applicants earlier systems this is prevented by providing a shoulder on the steering column shaft where it enters the gearbox housing that will engage with a corresponding shoulder on the gearbox or within the shroud that supports the steering shaft. This works well but does have assembly disadvantages in that it adds additional constraints to the design of the gearbox or shroud.

BRIEF SUMMARY OF THE INVENTION

According to a first aspect the invention provides a torque sensor for use in an electric power assisted steering system comprising:

a first shaft, a second shaft, and a torsion bar that connects the first shaft to the second shaft, a hollow sleeve that is secured at a first position to the first shaft and extends along the torsion bar to at least partially axially overlap the second shaft, angular deflection indicating means that produce a signal that is dependent on the angular deflection of the first shaft relative to the second shaft as a torque is applied across the torque sensor that causes the torsion bar to twist, at least one drive dog fixed to the sleeve and at least one corresponding drive dog fixed to the second shaft, in normal operation the two dogs being offset so that they permit a defined range of angular deflection of the torsion bar but will engage each other to provide a path for torque to be transferred from the first shaft to the second shaft in the event of a failure of the torsion bar, and a connecting element which has a first part that is secured within a bore in one of the second shaft and the sleeve, the connecting element having a second part that extends into a feature of the other of the second shaft and the sleeve, at zero torque across the torque sensor the connecting element being spaced circumferentially from the feature by an angular distance greater than the spacing between the drive dogs and spaced from the feature in a direction along the axis of the shafts that is less than the overlap of the drive dogs in that direction to prevent the shafts moving apart in the event of failure of the torsion bar by an amount that would otherwise prevent the drive dogs engaging.

The connecting element may comprise a pin, which may comprise an elongate element having a generally circular cross section along all or most of its length. It may be tapered from both ends towards the centre, giving a barrel like shape, tapered from one end to the other, or of generally uniform diameter along all or most of its length.

The connecting element may include one or more circumferential grooves at spaced locations along its length which may assist the connecting element in gripping onto the bore into which it is fixed.

The feature that the connecting element projects into may comprise an oversized bore into which a portion of the connecting element extends.

The feature may comprise a slot that extends tangentially across an inner face of the sleeve or an outer face of the second shaft. Alternatively the feature may comprise an oversized bore that the connecting element projects into.

The feature, where it is a bore, may extend in a plane that is orthogonal to the axis of the torsion bar, and most preferably extend radially into or away from the axis of the torsion bar.

The connecting element may be a press fit into the bore into which it is secured, such as an interference fit. This ensures it will not fall out of the bore whilst requiring no adhesive or other fixings to hold it in place. It may be secured in the other manners, for example a threaded engagement.

In a first preferred arrangement, one part of the connecting element is secured in a bore in the sleeve and another part plunges into a feature in the form of an oversized bore in the second shaft. Each bore may extend radially towards the axis of the shafts. This provides for a simple assembly as the connecting element may be easily driven down into the bore in the outer shaft until it is plunged into the bore in the inner shaft.

The end of the connecting element may be flush with the adjacent outer surface of the second shaft when in a position of use, or recessed into the second shaft or may stand slightly proud.

In a second preferred arrangement the connecting element may be a press fit in a bore in the second shaft and a part of the connecting element may be located within an oversized bore in the sleeve.

In a third preferred arrangement one part of the connecting element may be secured in a bore in the sleeve and another part plunges into a feature in the form of a slot that extends linearly across a part of the circumference of the second shaft. This may be formed by drilling away part of the second shaft using a drill bit that extends perpendicular to the axis of the second shaft and is spaced radially away from the axis.

In a fourth preferred arrangement the base of the slot may be a curved, turned, groove rather than a linear slot. The connecting element may be press fitted into the sleeve and project loosely into the groove.

There may be one drive dog on each of the sleeve and second shaft, but preferably there may be a plurality of drive dogs associated with the sleeve and a plurality of drive dogs associated with the second shaft arranged as teeth spaced around the circumference of the sleeve and second shaft.

In a most preferred arrangement the drive dogs comprise flats formed into the outer face of the second shaft and flats formed into the inner face of the sleeve, the flats in the rest position facing each other but spaced apart and when an excess torque is applied the flats contacting to prevent excess relative rotation.

The first shaft, second shaft and torsion bar may all share a common axis.

The first shaft may comprise an output shaft and the second shaft an input shaft, the angular deflection indicating means indicating the torque applied from the input shaft to the output shaft. In use the input shaft maybe connected to a steering wheel of a vehicle through a steering column shaft, and the output shaft to the road wheels through a further part of the steering gear.

The torque sensor may be located within a housing of a gearbox. The gearbox housing may also support an electric motor that has a rotor that connects to the output shaft of the torque sensor through a gearset within the gearbox housing.

The sleeve may comprise a generally cylindrical tube that fits around the torsion bar. It may be an integral part of the first shaft, for instance being formed by hollowing out the end of the first shaft to form a bore into which the torsion bar is received. In this case, the end of the second shaft may be splined to engage corresponding splines at the bottom of the bore.

In an alternative the sleeve may be a separate component secured to the first shaft by a suitable connector assembly so that it does not rotate axially relative to the first shaft.

The sleeve need not completely surround the torsion bar. It may, for example, be one or more elongate fingers that project axially from the first shaft to a position overlapping the second shaft.

The first and second shafts may be provided with axially extending splines extending around an end portion furthest from the torsion bar to permit connection of the torque sensor to one or more shafts along which torque is to be applied.

The rigid connection may be by virtue of the shaft and output connector part being integrally formed, or by otherwise being securely connected.

The torque sensor may include processing means that determines the torque from the output of the angular deflection means.

The angular deflection indicating means may comprise one or more angular position sensors that measure the angular position of at least one of the first shaft, the second shaft or the angular deflection of the input shaft relative to the second shaft.

According to a second aspect the invention provides an electric power assisted steering system comprising a steering column shaft, a gearbox, an electric motor that is connected to the steering column shaft through the gearbox, a torque sensor according to the first aspect of the invention arranged so that one the first and second shafts of the torque sensor are connected to the gearbox and the other to the steering column shaft, and a processing circuit that receives the output of the torque sensor and derives from that output a torque demand signal indicative of an assistance torque to be applied through the gearbox by the electric motor, the assistance torque acting in the same sense as the driver applied torque to reduce the effort needed to operate the steering.

In a preferred arrangement the first shaft is connected to the steering column shaft and the second shaft to the gearbox.

The torque sensor may be an integral part of the gearbox. The two may share a common housing.

The gearbox may connect the steering column shaft to the road wheels of the vehicle.

Other advantages of this invention will become apparent to those skilled in the art from the following detailed description of the preferred embodiments, when read in light of the accompanying drawings.

BRIEF DESCRIPTION OF THE DRAWINGS

FIG. 8 shows a view in cross section in a plane containing the axis of the torque sensor, showing the location of a connecting element according to a second embodiment of a torque sensor within the scope of the invention;

FIG. 9 is an enlarged view of the part of FIG. 8 shown in a circle;

FIG. 10 is a perspective view of an end part of the sleeve of the torque sensor of FIG. 8;

FIG. 11 is a perspective view of an end part of the sleeve of the torque sensor of FIG. 8;

DETAILED DESCRIPTION OF THE INVENTION

Figure 1:
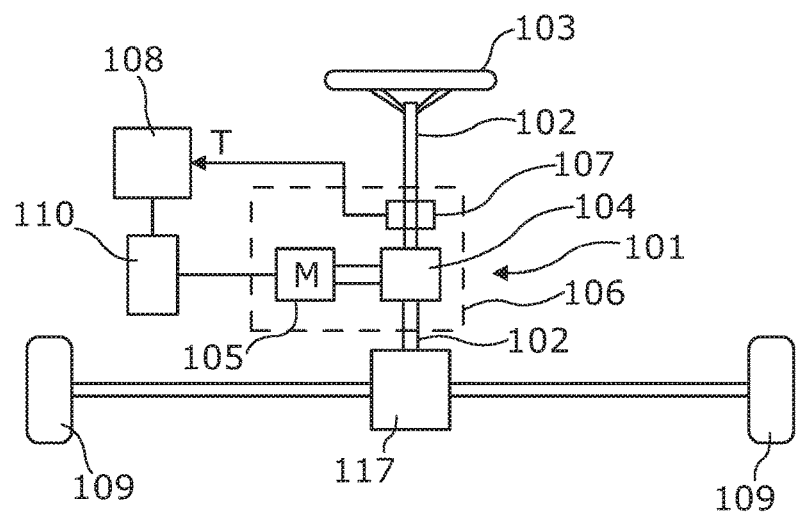
FIG. 1 shows a steering system for a vehicle such as a car or light van comprising a steering column shaft that is supported within a shroud.

As shown in FIG. 1, a steering system 101 for a vehicle such as a car or light van comprises a steering column shaft 102 that is supported within a shroud (not shown). The shaft 102, which is typically a two part telescopic shaft, is connected to the steering wheel 103 at one end and engages a gearbox 104 at the other end, down towards the feet of the driver. The gearbox 104 is connected to a fixed part of the vehicle and a support bracket (not shown), located between the gearbox 104 and steering wheel 103, is secured to another fixed part of the vehicle such as the bulkhead (not shown). The steering column shaft 102 is supported within the shroud by bearings that allow it to rotate as the driver turns the steering wheel.

The gearbox 104 includes a reduction gearset comprising a worm and wheel that connects the shaft to the rotor of an electric motor 105. The gearbox 104 also connects the shaft to the road wheels 109 of the vehicle, usually through a rack and pinion assembly 117. As the steering column shaft rotates, the rack and pinion assembly 117 cause the wheels of the vehicle to turn.

The electric motor 105 is driven by a drive circuit 110 to apply a torque to the steering column shaft. The motor 105 in this example is a three phase motor and the drive circuit 110 in this example comprises a bridge having an upper switch that connects a respective phase to a positive supply voltage and a lower switch, that when closed connects the phases to a negative supply voltage or ground. By opening and closing the switches in response to pulse width modulated drive signals, the current in the motor, and hence the torque, can be accurately controlled.

The PWM control signals for the drive circuit 110 are generated by a controller 108. A torque sensor 107 is provided which measures the torque applied to the column shaft by the driver. This is located in the gearbox housing 106 on the input side of the gearbox 104, by which we mean the side that connects to the steering column shaft 102. As such the torque measured will be indicative of the torque applied to the column shaft 102 by the driver turning the steering wheel 103.

This torque measurement is fed into the controller 108 and used as the basis for producing a torque demand signal. Generally speaking, the higher the measured torque, the larger the value of the torque demand signal. The controller 108 then converts this demand signal into appropriate PWM control signals for the motor 105. An example of such a controller 107 is taught in the applicant's earlier patent application WO/2003/105329.

Figure 2:
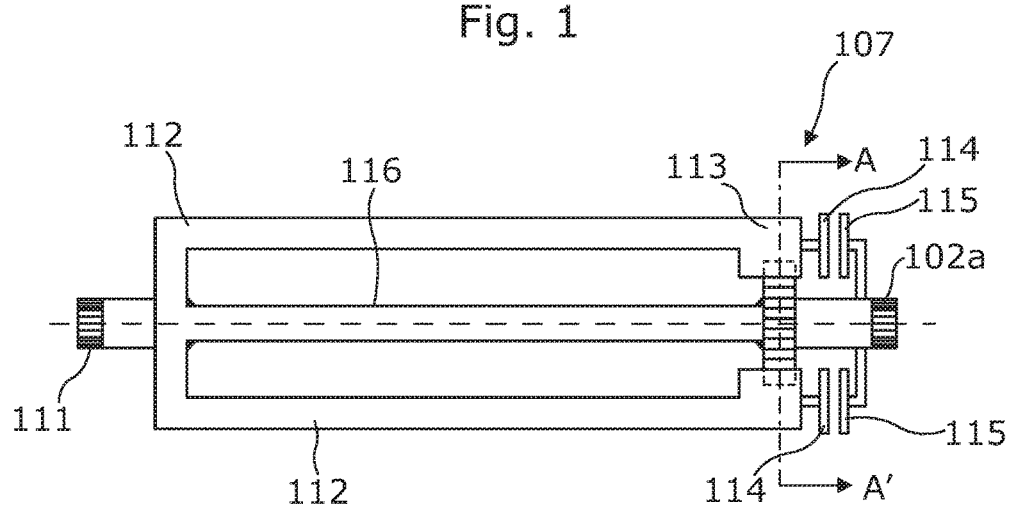
FIG. 2 shows a torque sensor of the steering system of FIG. 1 in more detail.
Figure 3:
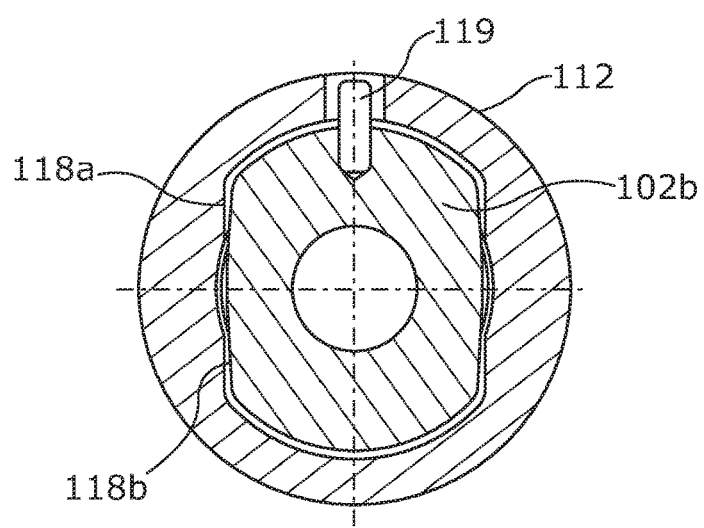
FIG. 3 shows the drive dogs of the torque sensor and second shaft of FIG. 1.

The torque sensor 107 is shown in more detail in FIG. 2 of the drawings. The sensor 107 is a mechanical sensor that functions by measuring the angular deflection between a first shaft 102a and a second shaft 102b which are connected together by a torsion bar 116. The sensor 107 is located inside the gearbox housing 106, with the first shaft 102a being coupled through a splined connection 111 to the worm and wheel gear, and the second shaft 102b through a splined coupling to the steering column shaft.

The torsion bar 116 is surrounded by a hollow sleeve 112 that is secured at a first position to the first shaft 102a and extends along the torsion bar 116 to at least partially axially overlap the second shaft 102b. Connected to the overlapping end 113 of the sleeve 112 is a first part of angular deflection indicating means 114 whilst a second part 115 is connected to the second shaft 102b. Many angular deflection indicating means are known in the art and any one may be used as part of the present invention. However inductive angular deflection indicating means are preferred.

The output of the angular deflection 114,115 means is a signal that represents the torque in the torsion bar 116.

Also provided on the end 113 of the sleeve 112 where it overlaps the second shaft 102b is a set of drive dogs 118a, which in this example are in the form of two internal flats on diametrically opposed sides of the axis sleeve. The second shaft 102b is provided with a set of corresponding drive dogs 118b in the form of flats on the outer surface of the shaft 102b that are also diametrically opposed. In normal operation the two pairs of flats 118a, 118b are spaced apart so that they permit a defined range of angular deflection of the torsion bar 116 but will engage each other to provide a path for torque to be transferred from the first shaft 102a to the second shaft 102b in the event of a failure of the torsion bar 116.

To prevent the second shaft 102b being pulled out of the gearbox 104 in the event of a failure of the torsion bar 116, the torque sensor 107 of the invention also includes a connecting element 119 which has a first part that is secured within a bore in one of the second shaft 102b and the sleeve 113. In this instance the connecting element is a pin 119 having a second part that extends into a feature of the other of the second shaft 102b and the sleeve 112, at zero torque across the torque sensor 107 the pin 119 being spaced circumferentially from the feature by an angular distance greater than the spacing between the drive dogs 118a,118b and spaced from the feature in a direction along the axis of the shafts 102a, 102b that is less than the overlap of the drive dogs 118a,118b in that direction to prevent the input and output shafts 102a, 102b moving apart in the event of failure of the torsion bar 116 by an amount that would otherwise prevent the drive dogs 118a,118b engaging.

FIGS. 4 to 19 show four alternative embodiments in more detail, each of which includes a different arrangement for the connecting element, the bore and the feature.

Embodiment 1

Figure 4:
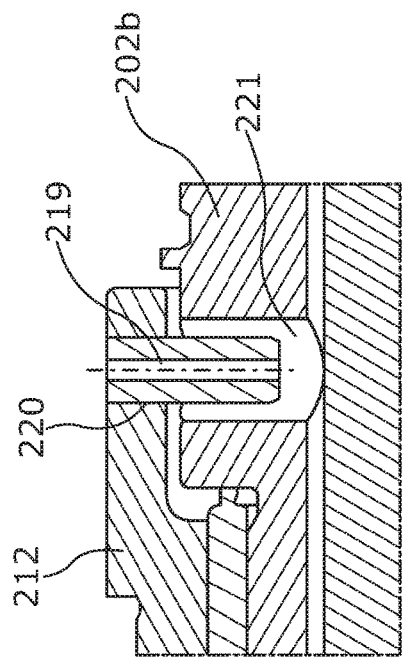
FIG. 4 shows a view in cross section in a plane containing the axis of the torque sensor, showing the location of a connecting element according to a first embodiment of a torque sensor within the scope of the invention.
Figure 5:
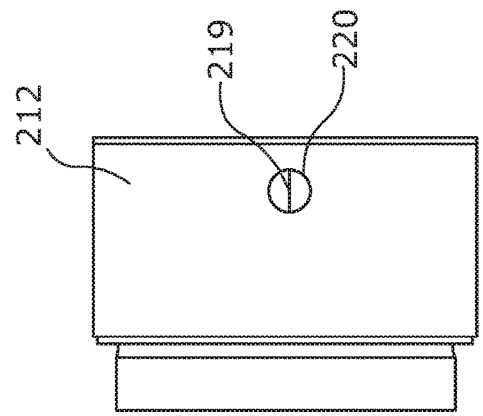
FIG. 5 is an enlarged view of the part of FIG. 4 shown in a circle.
Figure 7:
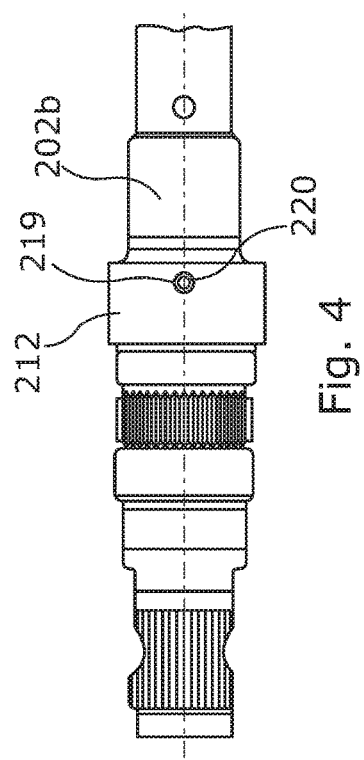
FIG. 7 is a perspective view of an end part of the sleeve of the torque sensor of FIG. 4.
Figure 6:
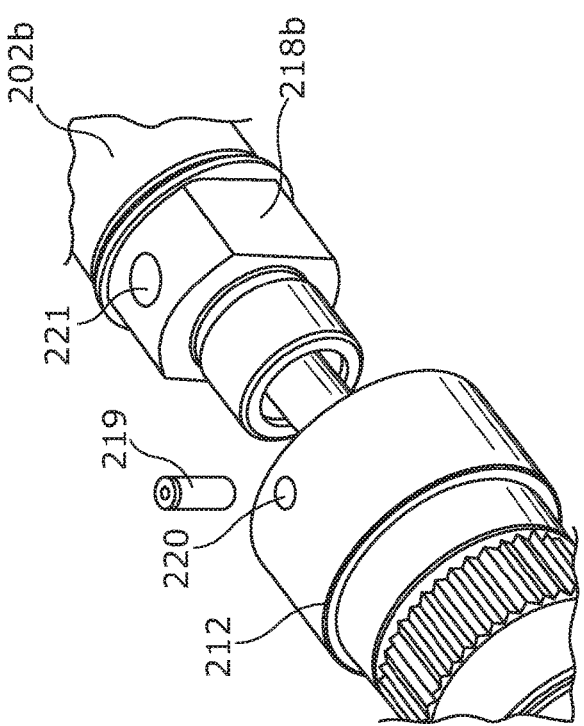
FIG. 6 is a perspective view of the part of the torque sensor of FIG. 4 prior to assembly.

FIG. 4 is a view in cross section in a plane containing the axis of the torque sensor 207 showing the location of a connecting element 219 in a first embodiment of a torque sensor 207 within the scope of the invention, and FIG. 5 is an enlarged view of the part of FIG. 4 shown in a circle. FIG. 6 is a perspective view of the part of the torque sensor 207 prior to assembly. FIG. 7 shows in perspective an end part of the sleeve 212 of the torque sensor 207.

A connecting element 219, in the form of an elongate metal pin with a generally uniform circular cross section, is press fitted into a bore 220 in the end of the sleeve 212 where it overlaps the second shaft 202b. The bore 220 extends radially from the outer surface of the sleeve 212 right through the sleeve 212 towards the axis of the sleeve 212. Aligned with this bore 220 is a feature in the end of the second shaft 202b. This is also a bore 221, which extends towards the axis of the second shaft 202b, but of a larger diameter than the bore 220 in the sleeve 212. This means that the pin 219 is a loose fit in the bore 221. The bores 220,221 are aligned when zero torque is applied to the torsion bar 216 so that the pin 219 does not contact the side wall of the bore 221 in the second shaft 202b, and when torsion is applied that causes the pin 219 to move sideways in the bore 221 in the second shaft 202b (as the sleeve rotates around the axis of the second shaft), the pin 219 will also not contact the sides because the drive dogs (male dog 218b shown) will engage before that happens. This ensures that the pin 219 does not carry any side load during normal use and the drive dogs (male dog 218b shown) can function correctly.

In the event of a failure of the torsion bar 216, and a load applied along the axis of the second shaft 202b that would tend to cause it to move away from the first shaft (not shown), the pin 219 will come into contact with the side of the enlarged bore 221 in the second shaft 202b. This will then stop any further axial movement of the second shaft 202b away from the first shaft. Significantly, in this position the drive dogs still overlap and the flats defining the male and female dogs will not be engaged.

Of course, rather than being a larger bore 221 the same result could be achieved by making the part of the pin 219 that projects into the bore 221 in the second shaft 202b of a reduced diameter.

Embodiment 2

FIGS. 8 to 11 are views corresponding with those of FIGS. 4 to 7 for a second embodiment of a torque sensor within the scope of the invention. This embodiment differs in that the connecting element 319 is press fitted into a bore 321 in the second shaft but loosely fits within a bore 320 in the sleeve 312 of the torque sensor 307.

FIG. 8 is a view in cross section in a plane containing the axis of the torque sensor 307 showing the location of a connecting element 319 in a first embodiment of a torque sensor 307 within the scope of the invention, and FIG. 9 is an enlarged view of the part of FIG. 8 shown in a circle. FIG. 10 is a perspective view of the part of the torque sensor 307 prior to assembly. FIG. 11 shows in perspective an end part of the sleeve 312 of the torque sensor 307.

A connecting element 319, in the form of an elongate metal pin with a generally uniform circular cross section, is press fitted into a bore 321 in the outer surface of the second shaft 302b in the end where it overlaps the sleeve 312. Aligned with this bore 321 is a bore 320 in the sleeve 312 which extends radially from the outer surface of the sleeve 312 right through the sleeve 312 towards the axis of the sleeve 312, but this bore 320 is of a larger diameter than the bore 321 of the second shaft 302b. This means that the pin 319 is a loose fit in the bore 220. The bores 220,221 are aligned when zero torque is applied to the torsion bar 216 so that the pin 319 does not contact the side wall of the bore 320 in the sleeve 312, and when torsion is applied that causes the pin 319 to move sideways in the bore 320 in the sleeve 312 (as the sleeve rotates around the axis of the second shaft), the pin 319 will also not contact the sides because the drive dogs (male dog 318b shown) will engage before that happens. This ensures that the pin 319 does not carry any side load during normal use and the drive dogs (male dog 318b shown) can function correctly.

In the event of a failure of the torsion bar 316, and a load applied along the axis of the second shaft 302b that would tend to cause it to move away from the first shaft (not shown), the pin 319 will come into contact with the side of the enlarged bore 320 in the sleeve 312. This will then stop any further axial movement of the second shaft 202b away from the first shaft. Significantly, in this position the drive dogs (male dog 318b shown) still overlap.

Of course, rather than being a larger bore 320 the same result could be achieved by making the part of the pin 319 that projects into the bore 320 in the sleeve 312 of a reduced diameter.

Embodiment 3

FIGS. 12 to 15 are views corresponding with those of FIGS. 4 to 7 for a third embodiment of a torque sensor within the scope of the invention.

In this embodiment, one part of the connecting element is secured in a bore in the sleeve and another part that plunges into a feature in the form of a slot that extends linearly across a part of the circumference of the second shaft.

Figure 13:
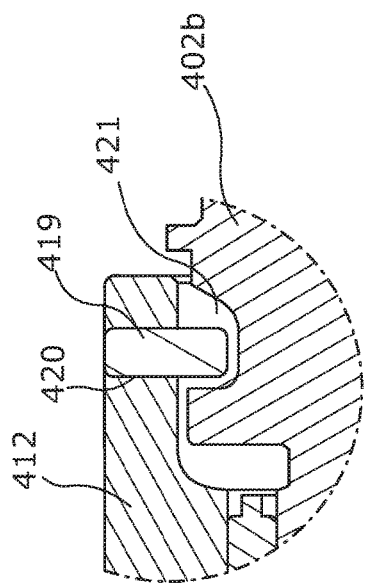
FIG. 13 is an enlarged view of the part of FIG. 12 shown in a circle.
Figure 15:
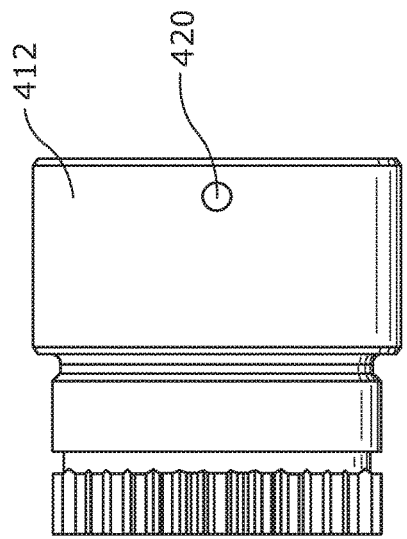
FIG. 15 is a perspective view of an end part of the sleeve of the torque sensor of FIG. 12.
Figure 12:
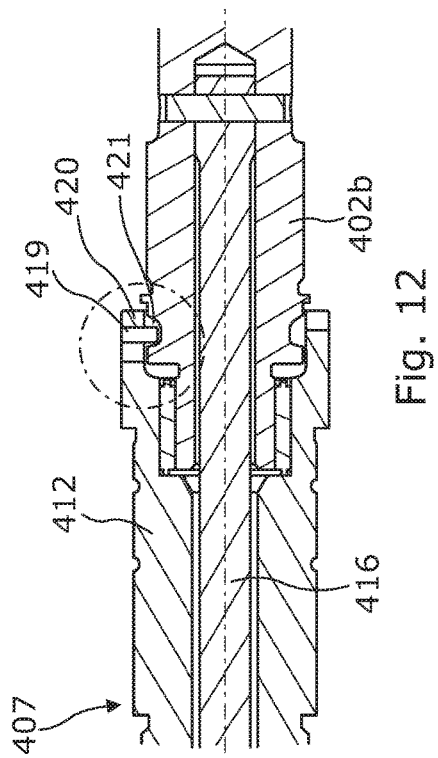
FIG. 12 shows a view in cross section in a plane containing the axis of the torque sensor, showing the location of a connecting element according to a third embodiment of a torque sensor within the scope of the invention.
Figure 14:
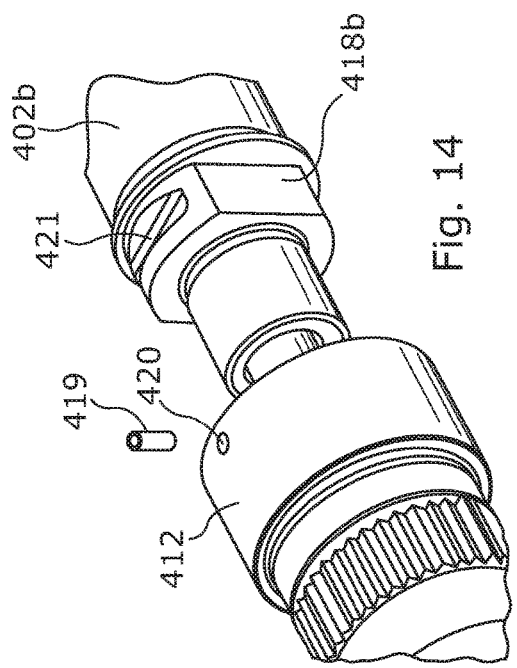
FIG. 14 is a perspective view of an end part of the sleeve of the torque sensor of FIG. 12.
Figure 17:
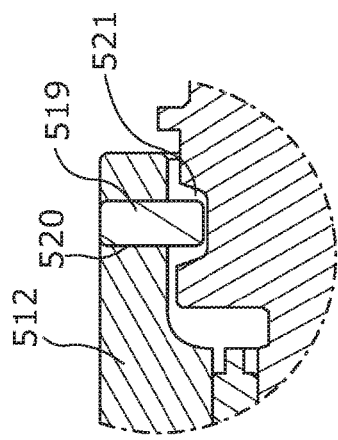
FIG. 17 is an enlarged view of the part of FIG. 8 shown in a circle.

FIG. 12 is a view in cross section in a plane containing the axis of the torque sensor 407 showing the location of a connecting element 419 in a first embodiment of a torque sensor 407 within the scope of the invention, and FIG. 13 is an enlarged view of the part of FIG. 12 shown in a circle. FIG. 14 is a perspective view of the part of the torque sensor 407 prior to assembly. FIG. 15 shows in perspective an end part of the sleeve 412 of the torque sensor 407.

A connecting element 419, in the form of an elongate metal pin with a generally uniform circular cross section, is press fitted into a bore 420 in the end of the sleeve 412 where it overlaps the second shaft 402b. The bore 420 extends radially from the outer surface of the sleeve 412 right through the sleeve 412 towards the axis of the sleeve 412. Aligned with this bore 420 is a feature in the end of the second shaft 402b. This feature is a slot 421 that extends linearly across a part of the circumference of the second shaft 402b. This may be formed by drilling away part of the second shaft using a drill bit that extends perpendicular to the axis of the second shaft and is spaced radially away from the axis. The pin 419 is a loose fit in the slot 421. The bore 420 and slot 421 are aligned when zero torque is applied to the torsion bar 416 so that the pin 419 does not contact the slot 421 in the second shaft 402b, and when torsion is applied that causes the pin 419 to move sideways in the slot 421 in the second shaft 402b (as the sleeve rotates around the axis of the second shaft), the pin 419 will also not contact the slot 421 because the drive dog (male dog 418b shown) will engage before that happens. This ensures that the pin 419 does not carry any side load during normal use and the drive dogs (male dog 418b shown) can function correctly.

In the event of a failure of the torsion bar 416, and a load applied along the axis of the second shaft 402b that would tend to cause it to move away from the first shaft (not shown), the pin 419 will come into contact with the side of the slot 421 in the second shaft 402b. This will then stop any further axial movement of the second shaft 402b away from the first shaft. Significantly, in this position the drive dogs still overlap.

Of course, this arrangement can be inverted such that the pin is press fitted within the second shaft wherein the inner surface of the sleeve comprises a slot which contacts the pin only in the event of failure of the torsion bar.

Embodiment 4

FIGS. 16 to 19 are views corresponding with those of FIGS. 4 to 7 for a fourth embodiment of a torque sensor within the scope of the invention.

In this embodiment, the second shaft comprises a slot is a curved, turned, groove rather than a linear slot. The connecting element is press fitted into the sleeve and project loosely into the slot.

Figure 19:
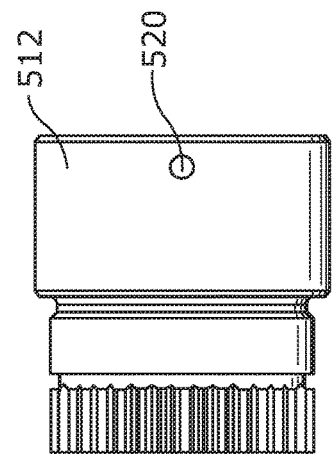
FIG. 19 is a perspective view of an end part of the sleeve of the torque sensor of FIG. 16.
Figure 16:
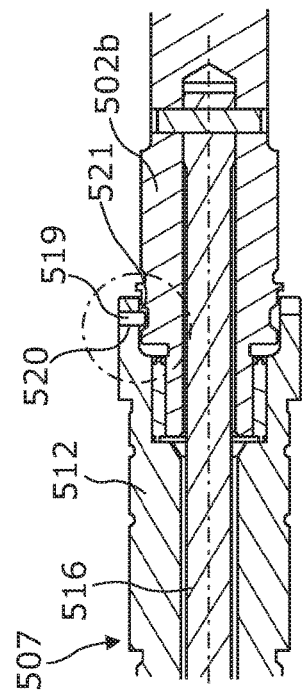
FIG. 16 shows a view in cross section in a plane containing the axis of the torque sensor, showing the location of a connecting element according to a fourth embodiment of a torque sensor within the scope of the invention.
Figure 18:
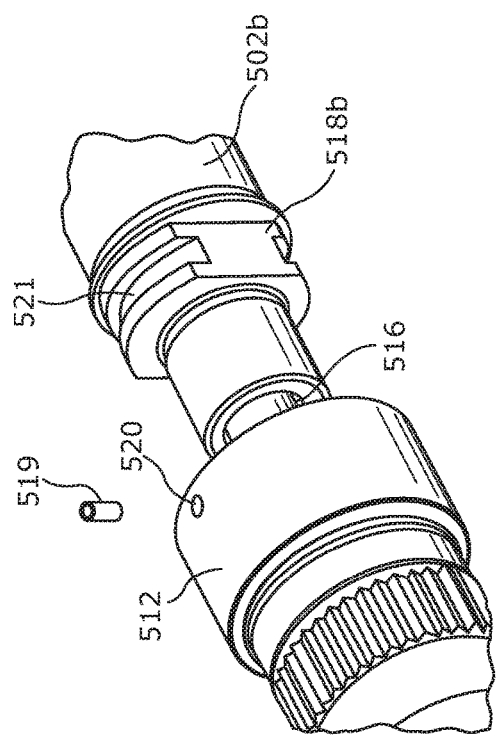
FIG. 18 is a perspective view of an end part of the sleeve of the torque sensor of FIG. 16.

FIG. 16 is a view in cross section in a plane containing the axis of the torque sensor 507 showing the location of a connecting element 519 in a first embodiment of a torque sensor 507 within the scope of the invention, and FIG. 517 is an enlarged view of the part of FIG. 16 shown in a circle. FIG. 18 is a perspective view of the part of the torque sensor 507 prior to assembly. FIG. 19 shows in perspective an end part of the sleeve 512 of the torque sensor 507.

A connecting element 519, in the form of an elongate metal pin with a generally uniform circular cross section, is press fitted into a bore 520 in the end of the sleeve 512 where it overlaps the second shaft 502b. The bore 520 extends radially from the outer surface of the sleeve 512 right through the sleeve 512 towards the axis of the sleeve 512. Aligned with this bore 520 is a feature in the end of the second shaft 502b. This feature is a slot 521 which is a curved, turned, groove rather than a linear slot. The pin 519 is a loose fit in the slot 521. The bore 520 and slot 521 are aligned when zero torque is applied to the torsion bar 516 so that the pin 519 does not contact the slot 521 in the second shaft 502b, and when torsion is applied that causes the pin 519 to move sideways in the slot 521 in the second shaft 502b (as the sleeve rotates around the axis of the second shaft), the pin 519 will also not contact the slot 521 because the drive dog (male dog 518b shown) will engage before that happens. This ensures that the pin 519 does not carry any side load during normal use and the drive dogs (male dog 518b shown) can function correctly.

In the event of a failure of the torsion bar 516, and a load applied along the axis of the second shaft 502b that would tend to cause it to move away from the first shaft (not shown), the pin 519 will come into contact with the side of the slot 521 in the second shaft 502b. This will then stop any further axial movement of the second shaft 502b away from the first shaft. Significantly, in this position the drive dogs (male dog 518b shown) still overlap.

Of course, this arrangement can be inverted such that the pin is press fitted within the second shaft, wherein the inner surface of the sleeve comprises a grooved slot which contacts the pin only in the event of failure of the torsion bar.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A torque sensor for use in an electric power assisted steering system comprising:
   a first shaft, a second shaft, and a torsion bar that connects the first shaft to the second shaft,
   a hollow sleeve that is secured at a first position to the first shaft and extends along the torsion bar to at least partially axially overlap the second shaft,
   angular deflection indicating means that produce a signal that is dependent on the angular deflection of the first shaft relative to the second shaft as a torque is applied across the torque sensor that causes the torsion bar to twist,
   at least one drive dog fixed to the sleeve and at least one corresponding drive dog fixed to the second shaft, in normal operation the drive dogs being offset so that the drive dogs permit a defined range of angular deflection of the torsion bar but will engage each other to provide a path for torque to be transferred from the first shaft to the second shaft in the event of a failure of the torsion bar, and
   a connecting element which has a first part that is secured within a bore in one of the second shaft and the sleeve, the connecting element having a second part that extends into a feature of the other of the second shaft and the sleeve, at zero torque across the torque sensor the connecting element being spaced circumferentially from the feature by an angular distance greater than a spacing between the drive dogs and spaced from the feature in a direction along an axis of the first and second shafts that is less than the overlap of the drive dogs in the direction along the axis to prevent the first and second shafts moving apart in the event of failure of the torsion bar by an amount that would otherwise prevent the drive dogs engaging.

2. The torque sensor of claim 1, wherein the connecting element comprises a pin.

3. The torque sensor of claim 1, wherein the connecting element comprises an elongate element having a generally circular cross section along all or most of a length thereof.

4. The torque sensor of claim 1, wherein the connecting element includes one or more circumferential grooves at spaced locations along the length thereof which assists the connecting element in gripping onto the bore into which the connecting element is fixed.

5. The torque sensor of claim 1, wherein the feature that the connecting element projects into comprises an oversized bore into which a portion of the connecting element extends.

6. The torque sensor of claim 1, wherein the feature comprises a slot that extends tangentially across an outer face of the sleeve or an inner face of the second shaft.

7. The torque sensor of claim 1, wherein the connecting element is a press fit into the bore into which the connecting element is secured.

8. The torque sensor of claim 1, wherein one part of the connecting element is secured in a bore in the sleeve and another part plunges into a feature in a form of an oversized bore in the second shaft.

9. The torque sensor of claim 1, wherein the connecting element is a press fit in a bore in the second shaft and a part of the connecting element is located within an oversized bore in the sleeve.

10. The torque sensor of claim 1, wherein one part of the connecting element is secured in a bore in the sleeve and another part plunges into a feature in a form of a slot that extends linearly across a part of a circumference of the second shaft.

11. The torque sensor of claim 6, wherein a base of the slot is a curved, turned, groove.

12. The torque sensor of claim 1, wherein the drive dogs comprise flats formed into an outer face of the second shaft and flats formed into an inner face of the sleeve, the flats in a rest position facing each other but spaced apart and when an excess torque is applied the flats contacting to prevent excess relative rotation.

13. The torque sensor of claim 1, wherein there is a plurality of drive dogs associated with the sleeve and a plurality of drive dogs associated with the second shaft arranged as teeth spaced around the circumference of the sleeve and second shaft.

14. An electric power assisted steering system comprising a steering column shaft, a gearbox, an electric motor that is connected to the steering column shaft through the gearbox, a torque sensor of claim 1, so that one of the first and second shafts of the torque sensor are connected to the gearbox and the other to the steering column shaft, and a processing circuit that receives an output of the torque sensor and derives from the output a torque demand signal indicative of an assistance torque to be applied through the gearbox by the electric motor, the assistance torque acting in the same sense as a driver applied torque to reduce an effort needed to operate the steering.

15. The torque sensor of claim 7, wherein the connecting element is press fit into the bore by an interference fit.

* * * * *